V. H. MASTERS AND M. G. SHOOP.
TORPEDO TRAP.
APPLICATION FILED MAR. 20, 1918.
1,346,551. Patented July 13, 1920.
2 SHEETS—SHEET 1.
Fig. 1.
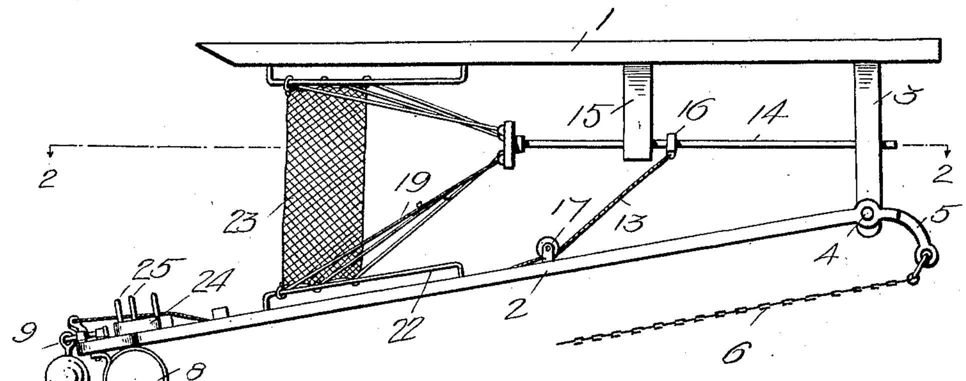
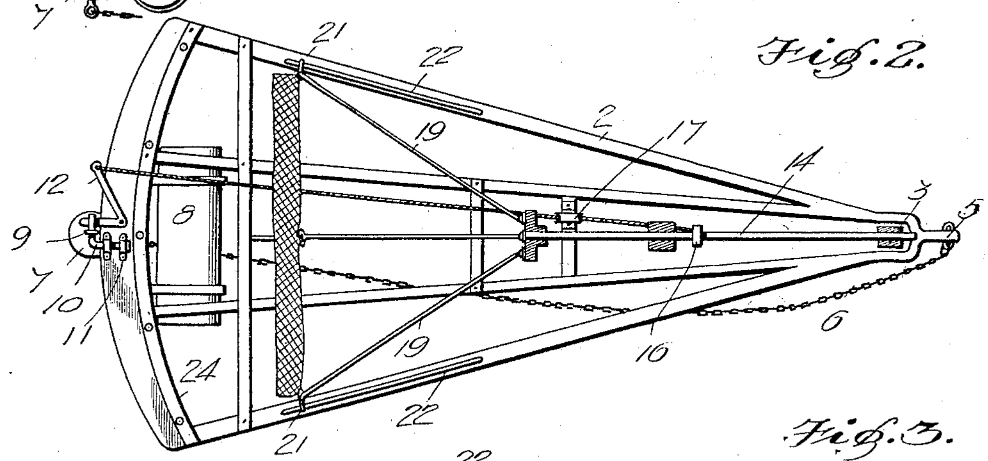
Fig. 3.
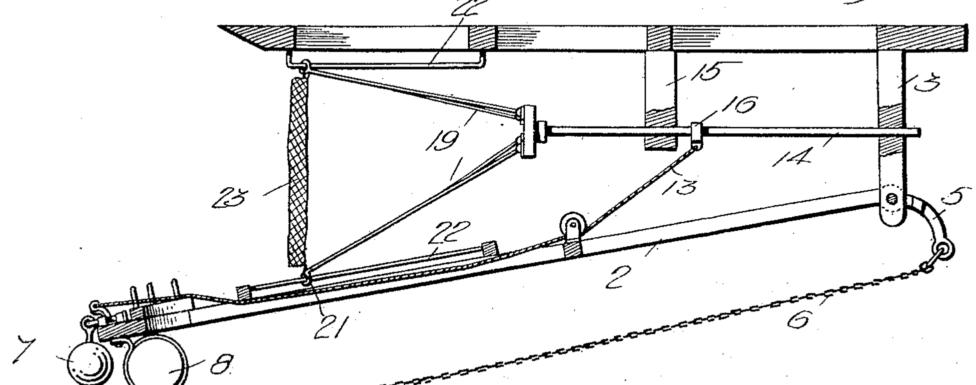
WITNESSES
H. Woodard
INVENTORS
V. H. Masters
& M. G. Shoop
BY Munn & Co.
ATTORNEYS V. H. MASTERS AND M. G. SHOOP.
TORPEDO TRAP.
APPLICATION FILED MAR. 20, 1918.
1,346,551. Patented July 13, 1920.
2 SHEETS—SHEET 2.
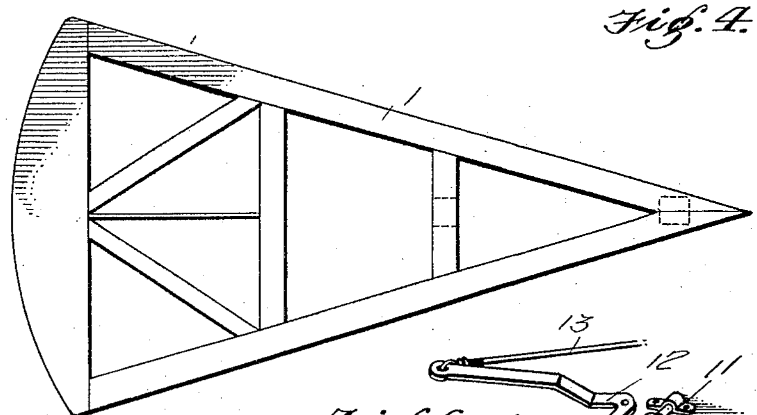
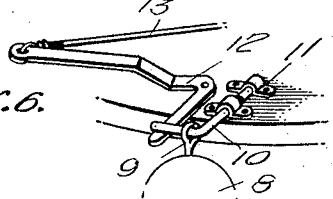
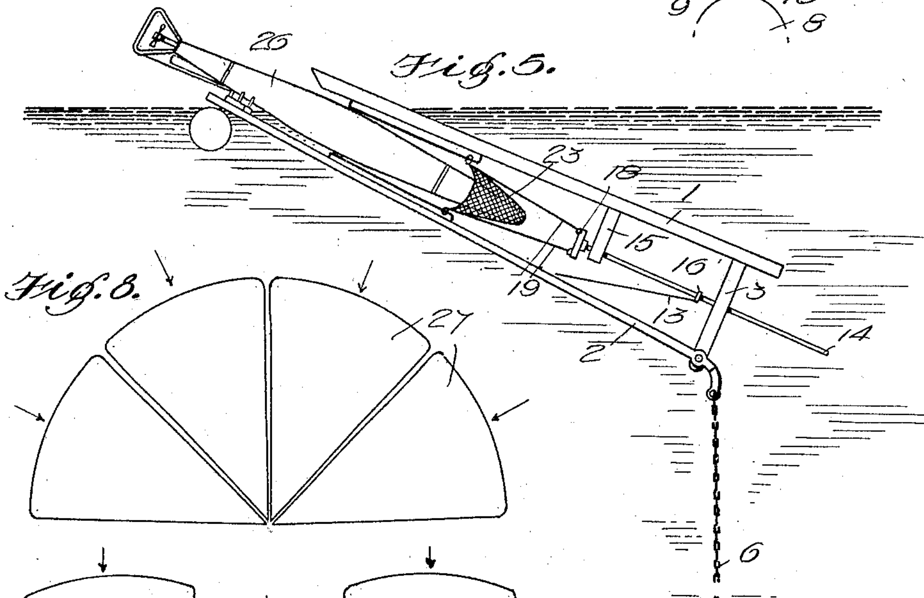
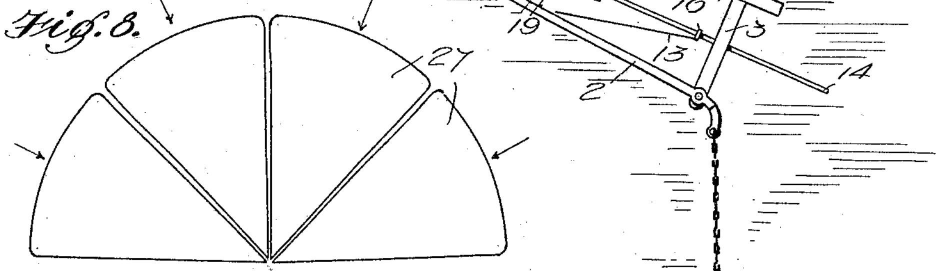
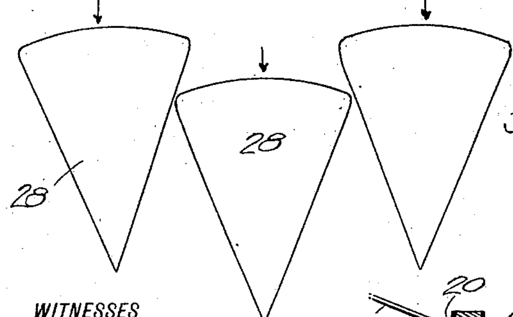
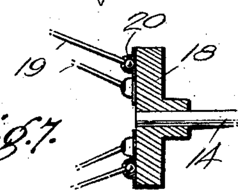
WITNESSES
H. Woodard
INVENTORS
V. H. Masters
& M. G. Shoop
BY
Munn & Co
ATTORNEYS

UNITED STATES PATENT OFFICE.

VERE HAMMOND MASTERS AND MILO GLENN SHOOP, OF SIOUX FALLS, SOUTH DAKOTA.

TORPEDO-TRAP.

1,346,551. Specification of Letters Patent. Patented July 13, 1920.

Application filed March 20, 1918. Serial No. 223,541.

*To all whom it may concern:*

Be it known that we, VERE HAMMOND MASTERS and MILO GLENN SHOOP, citizens of the United States, and residents of Sioux Falls, in the county of Minnehaha and State of South Dakota, have invented certain new and useful Improvements in Torpedo-Traps, of which the following is a specification.

Our invention is an improvement in torpedo traps, and has for its object to provide a trap of the character specified, wherein upper and lower trap sections are provided, hinged together at one end, the free end of the lower section being buoyed to cause it to rise to the surface when unrestrained and being normally held below the surface by a counterweight, the sections supporting between them a net for engagement by the torpedo to check the progress of the same, and the net being connected to mechanism for releasing the counterweight when the net is struck by a torpedo to cause the trap to lift the propeller of the torpedo out of the water.

In the drawings:

Figure 1 is a side view of the improved trap;

Fig. 2 is a section on the line 2—2 of Fig. 1, looking in the direction of the arrows adjacent to the line;

Fig. 3 is a longitudinal vertical section;

Fig. 4 is a top plan view of the upper section;

Fig. 5 is a side view of the device in use, showing the manner of catching the torpedo;

Fig. 6 is a perspective view of the tripping mechanism for the counterweight;

Fig. 7 is a sectional view of the connection of the net holding rods with the tripping rod;

Fig. 8 is a diagrammatic plan view showing a method of arranging the traps in series;

Fig. 9 is a similar view showing another arrangement.

In the present embodiment of the invention, the trap consists of an upper section 1 and a lower section 2, the sections being substantially triangular in form, as shown in Figs. 2 and 4. Referring to these figures, it will be noted that each section consists of sides connected at one end and diverging toward the other, the diverging ends being connected by a base to form an open frame, and the members of the frame are braced strongly against each other as shown.

The upper section 1 has near its apex a depending bar 3, and to this bar the front end of the lower section is hinged, as indicated at 4. The bar 3 passes down between the side members of the lower section and is pivotally connected thereto, and the lower section has at its apex a downwardly curved extension 5, to which is connected one end of a flexible member 6, a chain in the present instance, the other end of the chain being connected with a counterweight 7 which is supported at the large end of the section.

The large end of the lower section of the frame is buoyed by a buoy 8 in the form of a cylindrical container, having sufficient buoyancy to lift the large end of the trap section upwardly to the water level as shown in Fig. 5. The counterweight 7, however, is of sufficient weight to hold the large end of the buoy submerged, as indicated in Fig. 1, and this weight is releasably connected with the section, to be released by the entrance of the torpedo in a manner to be presently described.

The counterweight has an eye 9 which engages the crank of a crank shaft 10 journaled in bearings 11 on the lower trap section. This shaft, when free to rotate, will swing the crank downwardly and the eye will slip off of the crank arm. To hold the crank of the crank shaft in horizontal position, an angle lever 12 is pivoted to the lower section, one of the arms of the lever being adapted to engage beneath the crank arm, while the flexible member 13 is connected with the other arm, the said flexible member being a rope or cable in the present instance, and being conected at its other end to a trip rod 14 which is mounted to slide between the frames, in the bar 3, and in a second bar 15 depending from the upper frame.

This rod 14 is provided with a collar 16 between the bars 3 and 15 and the cable is connected to this collar, said cable passing over a pulley 17 on the lower section between the collar and the trip lever. The rod 14 has a head 18 at its rear end, and to this head a series of rods 19 is connected, the rods being connected to that face of the head adjacent to the buoy, and the connection is a ball bearing connection, as indicated at 20 in Fig. 7. These rods at the end remote from the head have eyes 21 which are slidable upon guide rods 22 connected with the upper and lower sections of the trap, and a net 23 is connected with the rods at the eyes. Referring to Figs. 2 and 4, it will be noted that the base or wide ends of the sections are curved, and upon the base of the lower section is arranged a curved bar 24 which is provided with a series of upstanding teeth 25.

In operation, the device is arranged as shown in Figs. 1 and 2, the buoy and the lower section at its large end being held submerged by the counterweight. The buoyancy of the upper section holds it at about the water level, and holds it separated from the lower section as shown, with the net stretched between the sections. Arranged in this manner, when a torpedo strikes the net, the net will be moved along the guide rods 22, and the trip rod 14 will be moved with the net. The trip lever 12 will be swung, the crank shaft will be released, and the counterweight will drop, being held from loss by the chain 6, and shifting its weight from one end of the trap to the other, that is, from the large end to the small end. The buoy immediately lifts the large end of the trap in the manner shown in Fig. 5, and the propeller of the torpedo 26 will be lifted out of the water.

These traps may be arranged in series of four as shown in Fig. 8, wherein the traps are indicated generally at 27, the large ends of the traps being outward and the apices together. Thus the large ends of the trap form a half circle, so that a torpedo, coming from an arc of 180 degrees, will be trapped. On the other hand, they may be arranged as shown in Fig. 9, wherein three traps, indicated generally at 28, are provided, and arranged with their central axes parallel. The central trap is also staggered with respect to the lateral traps.

It will be understood that the traps are used in harbors, for instance, to protect the entrance to the harbors against the passage of torpedoes to shipping that may be within the harbor. Should the torpedo be exploded by contact with the trap, only the trap will be injured.

We claim:

1. A device of the character specified, comprising upper and lower sections hinged together at one end to swing toward and from each other, a buoy for the free end of the lower section for lifting the said end to the water level, a counterweight detachably connected with the said free end for normally submerging the said end, a flexible connection between the counterweight and the hinged end of the lower section for causing the weight of the counterweight to be shifted from the free end to the hinged end when it is released from the free end, a net supported between the sections for engagement by the torpedo, means for guiding the net, means for tripping and releasing the counterweight, and a connection between the same and the net guiding means for controlling the same when the net is engaged by a torpedo.

2. A device of the character specified, comprising upper and lower sections hinged together at one end, a buoy for the free end of the lower section, a counterweight connected with the said ends for normally submerging the same, a net suspended between the sections, releasable means for the counterweight controlled by the movement of the net, under the impact of a torpedo, a flexible connection between the counterweight and the hinged end of the sections for shifting the weight of the counterweight to the said hinged end when it is released, said net being mounted to shift with respect to the sections under the impact of the torpedo and the release of the counterweight being controlled by the shifting of the net.

3. A device of the character specified, comprising upper and lower sections hinged together at one end, a buoy for the free end of the lower section, a counterweight connected with the said end for normally submerging the same, a net suspended between the sections, releasable means for the counterweight controlled by the movement of the net under the impact of a torpedo, and a flexible connection between the counterweight and the hinged end of the sections for shifting the weight of the counterweight to the said hinged end when it is released.

4. A device of the character specified, comprising upper and lower sections hinged together at one end, a buoy for the free end of the lower section, a counterweight connected with the said end for normally submerging the same, a net suspended between the sections, and releasable means for the counterweight controlled by the movement of the net under the impact of a torpedo.

VERE HAMMOND MASTERS.
MILO GLENN SHOOP.

Witnesses:
R. L. WILSON,
WILLIS NETTUM.